(No Model.)
J. GEIBEL & E. G. PRICE.
SIDE BAR VEHICLE.
No. 287,016. Patented Oct. 23, 1883.
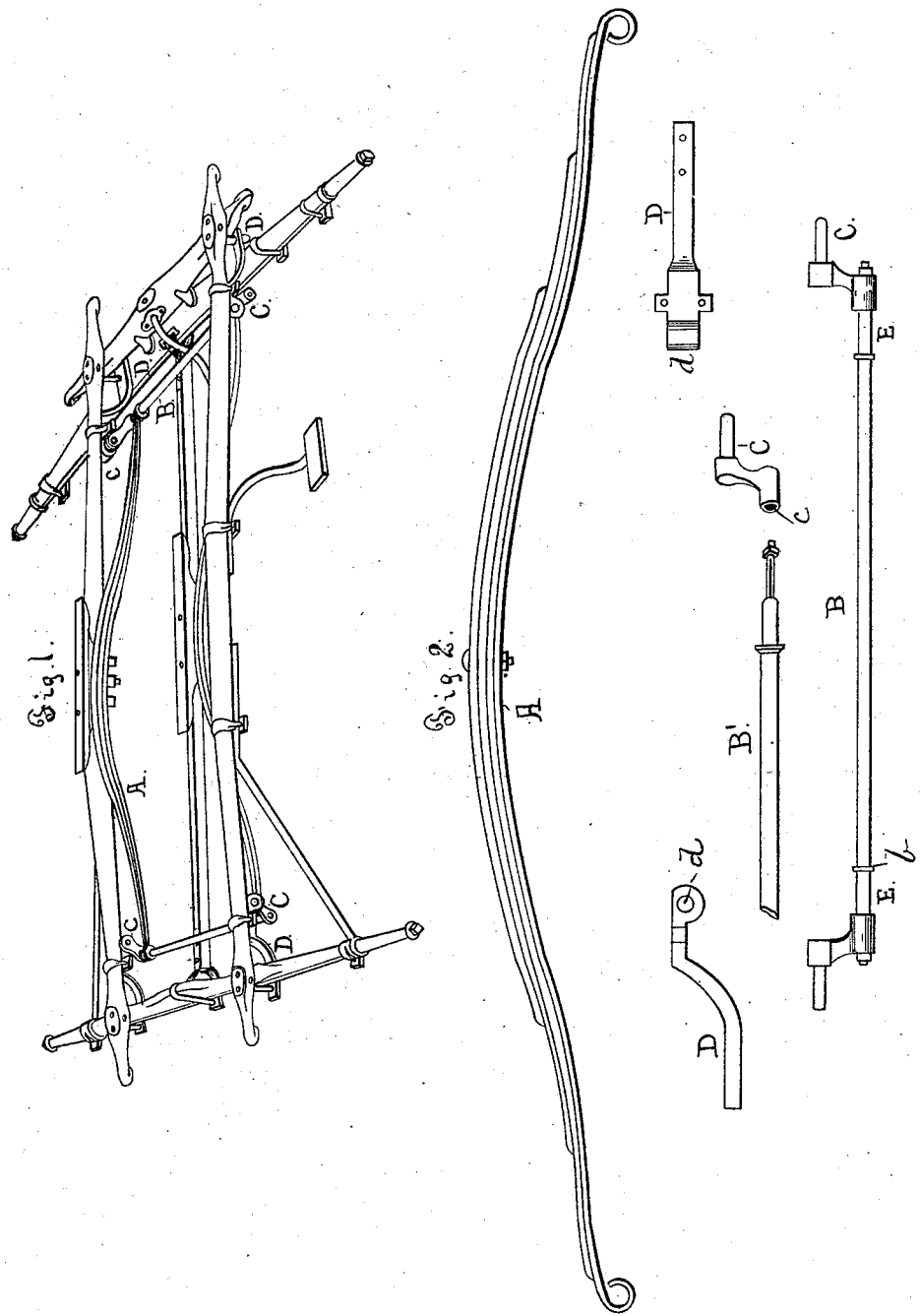

UNITED STATES PATENT OFFICE.

JACOB GEIBEL AND EDWARD G. PRICE, OF MONTGOMERY, ALABAMA.

SIDE-BAR VEHICLE.

SPECIFICATION forming part of Letters Patent No. 287,016, dated October 23, 1883.

Application filed July 14, 1883. (No model.)

*To all whom it may concern:*

Be it known that we, JACOB GEIBEL and E. G. PRICE, citizens of the United States, residing at Montgomery, in the county of Montgomery and State of Alabama, have invented new and useful Improvements in Side-Bar Vehicles, of which the following is a specification.

Our invention relates to improvements in side-bar vehicles, in which we use long springs running parallel with side bars hung on cranks, and connecting-rods attached to the side bars and axle behind and to side bars and head-block in front.

The objects of our improvements are, first, to produce the most easy and comfortable riding side-bar vehicle in use; second, by our mode of attaching springs to gearing, to produce a vehicle that is relieved of all unnecessary strain in all its parts, (both gearing and body;) third, in accomplishing above objects to maintain as neat and elegant appearance as any other side-bar vehicle now in use. We attain these objects by the mechanism illustrated in the accompanying drawings, in which—

Figure 1 is a representation of the "running-gear" or "carriage part" of a buggy with our improvements attached; Fig. 2, the spring and its attachments.

Similar letters refer to similar parts in both figures.

A A are springs; B, connecting-rod; C C, cranks; D D, crank journal-bearings and axle and head-block brace.

At B' and C' in Fig. 2 is shown the manner in which the connecting-rod and cranks are attached to each other. The part of the rod nearest the cranks is square, and made to enter square sockets in said cranks, and are held in place by nuts at the extreme ends of the rods. The parts of rods B marked E E are the bearings for the springs.

The two pieces in Fig. 2 marked D show side and bottom views of crank journal-bearings, axle, and head-block brace.

By referring to Fig. 1 it will be seen that we use two of the rods B, four of the cranks C, and four of the attaching devices D to complete attachments for springs to the running-gear or carriage part. It is also noticeable that the springs A in Fig. 1 are longer than the points where the cranks center their journals in attachments D, by which mode of attachment the springs are hung in an easy and natural position, and that, too, without any unnecessary play or slackness, for every pound of weight that comes upon them tightens the bearings and keeps them tight as long as weight remains, and it also prevents the excessive reaction of springs from a concussion. This we believe to be a decided improvement over all former modes of attaching side springs to gearings with or without the use of side bars, and fully attains our object in making an easy and comfortable riding vehicle. The shape of the springs will also be seen to be such that they are nearly concealed by the side bars, thus leaving the appearance of the vehicle neat and handsome, and not marred by a mass of springs in view either above or below the side bars. The connecting-rods B B are always on a level with the ends of springs, thus putting them entirely out of the way of the body.

We are aware that prior to our invention side-bar vehicles have been made with springs running parallel with side bars. We do not therefore claim such a combination, broadly; but What we do claim as our invention, and desire to secure by Letters Patent, is—

1. In a side-bar vehicle, the combination of the side bars, the Z-shaped connection, having one arm journaled in the side bar at right angles thereto, and depending, as shown, with its lower arm made tubular, to provide a bearing or socket for the spring-supporting shaft, the spring-supporting shaft, having its ends keyed in the socket formed in the connection, and constructed with the shoulder or stop $b$, and the spring, having its ends secured on the shaft between the shoulder and the connection, substantially as and for the purposes specified.

2. The framing for side-bar vehicles, substantially as described and shown, composed of the front axle, the bolster mounted thereon, the rear axle, the side bars, the braces D, provided at one end with the bearing $d$, and clipped near said bearing to the side bars and at their opposite ends to the bolster in front and the axle in rear of the vehicle, the Z-shaped connection, having its upper arm journaled in the bearing $d$ and its opposite arm constructed with a bearing, $c$, the shaft B, secured in the bearing $c$ and constructed with a shoulder, $b$, and the springs, having their opposite ends journaled on the shafts B, all arranged and operating substantially as and for the purposes specified.

JACOB GEIBEL.
E. G. PRICE.

Witnesses:
L. C. SEALL,
THOMAS RUDOLPH.